(12) United States Patent
Marusawa et al.

(10) Patent No.: US 6,598,980 B2
(45) Date of Patent: Jul. 29, 2003

(54) INTERIOR REARVIEW MIRROR

(75) Inventors: Masahiko Marusawa, Shizuoka (JP); Noriyuki Tsutsumi, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 10/171,587

(22) Filed: Jun. 17, 2002

(65) Prior Publication Data

US 2003/0011906 A1 Jan. 16, 2003

(30) Foreign Application Priority Data

Jul. 13, 2001 (JP) ........................................ 2001-213778

(51) Int. Cl.⁷ ................................................. G02B 5/08
(52) U.S. Cl. ........................ 359/604; 359/603; 359/872
(58) Field of Search ................................. 359/601, 602, 359/603, 604, 872, 875, 879; 248/476

(56) References Cited

U.S. PATENT DOCUMENTS 5,327,288 A * 7/1994 Wellington et al. ......... 359/604

FOREIGN PATENT DOCUMENTS

| JP | 63-38112 | 10/1988 |
|----|----------|---------|
| JP | 5-338493 | 12/1993 |
| JP | 6-32192  | 4/1994  |

* cited by examiner

Primary Examiner—Euncha Cherry
(74) Attorney, Agent, or Firm—Oblon, Spivak, McClelland, Maier & Neustadt, P.C.

(57) ABSTRACT

An interior rearview mirror 10 includes a stay 1 fastened on a ceiling in a vehicle, a mirror 2, a mirror housing 3, a bracket 4, and a lever that engages with the bracket 4 and tilts the mirror 2. At a lower end of the bracket 4 are alternately provided from side to side a first engageable projection having a projection at a front side, and a second engageable projection having a projection at a back side. At an upper end of the lever 5 are alternately provided from side to side a first engageable depression having a depression at a front side that engages with the first engageable projection, and a second engageable depression having a depression at a back side that engages with the second engageable projection.

1 Claim, 7 Drawing Sheets

INTERIOR REARVIEW MIRROR

BACKGROUND OF THE INVENTION

This invention relates to an interior rearview mirror attached to a ceiling near a driver's seat or an inside of a windshield in a vehicle, and particularly to an interior rearview mirror capable of reducing glare of light from headlamps of succeeding vehicles during night driving.

Light emitted from the headlamps of succeeding vehicles and directly reflected off the interior rearview mirror during night driving would dazzle a driver and thus threaten the safety of driving. Therefore, a reflection angle of the interior rearview mirror provided in the vehicle may be changed to an angle suitable for an antiglare purpose with a lever below the mirror operated by a driver.

Figure 6:
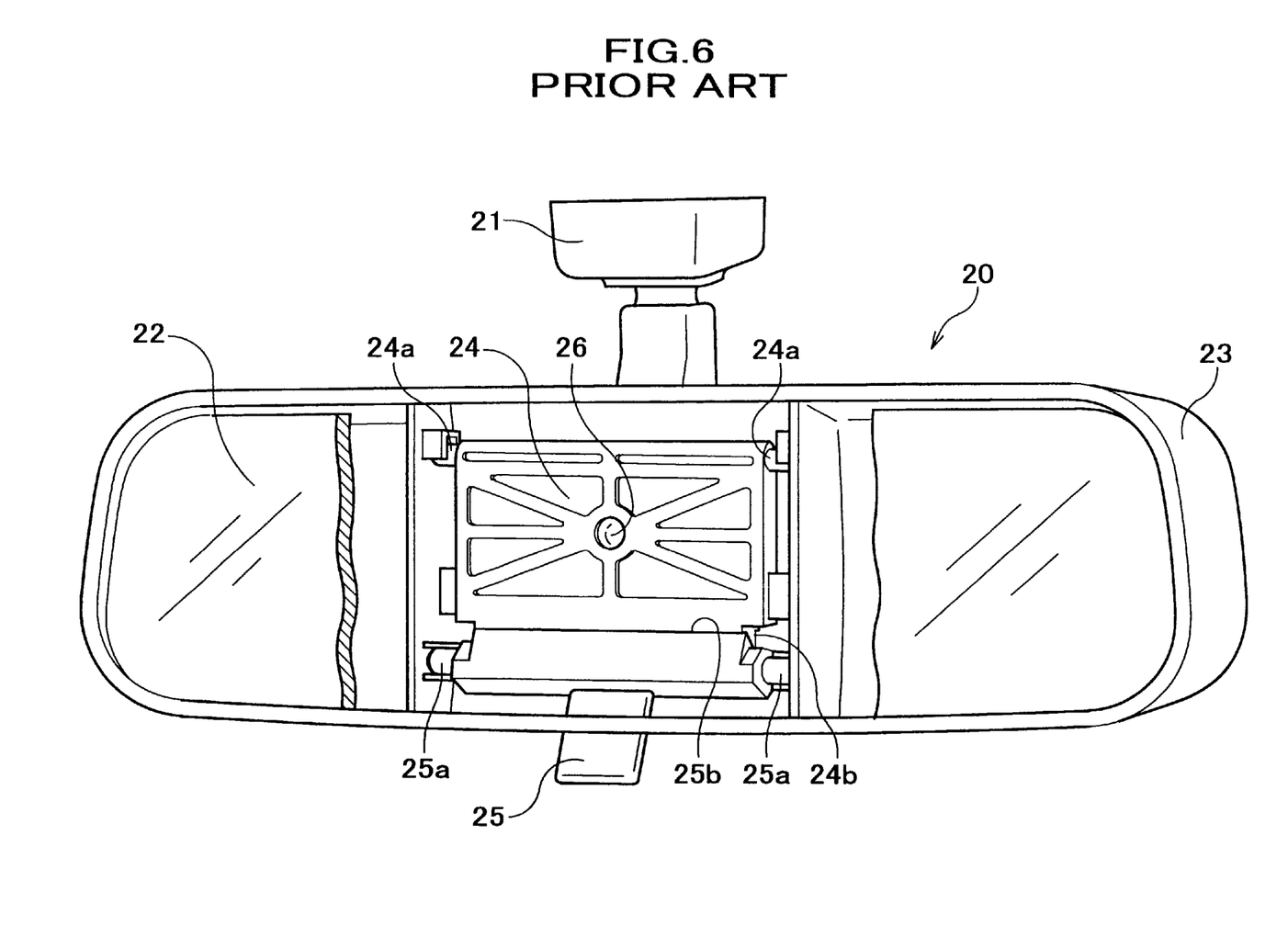
FIG. 6 is a partially cutaway view, in perspective, of a conventional interior rearview mirror.

FIG. 6 is a partially cutaway view, in perspective, of a conventional interior rearview mirror 20. As shown in FIG. 6, the conventional interior rearview mirror 20 is attached with a stay 21 to a ceiling near a driver's seat in a vehicle or an inside of a windshield. A mirror 22 made up of a prism is held in a groove provided in a mirror housing 23. At a distal end of the stay 21 is formed a ball joint 26, which has a spherical shape. The ball joint 26 is fitted into a socket formed in a midsection of a bracket 24 of the interior rearview mirror 20 so that the bracket 24 is joined to the stay 21.

Accordingly, when the mirror housing 23 is handled to adjust a field of view of the mirror 22, an adjustment in positioning of the mirror 22 is made by turning the bracket 24 about the ball joint 26 provided at the distal end of the stay 21. An antiglare operation to be performed to immediately change the reflection angle of the mirror 22 includes operating (pivoting) a lever 25 engaged with the bracket 24 so as to tilt the mirror housing 23, thereby changing the reflection angle of the prismatic mirror 22. The pivoting operation of the lever 25 is to switch the mirror 22 from a "Day" position to a "Night" position, or from the "Night" position to the "Day" position; the tilting operation is to change a reflection angle of the mirror 22 by pivoting the lever 25.

Figure 7A:
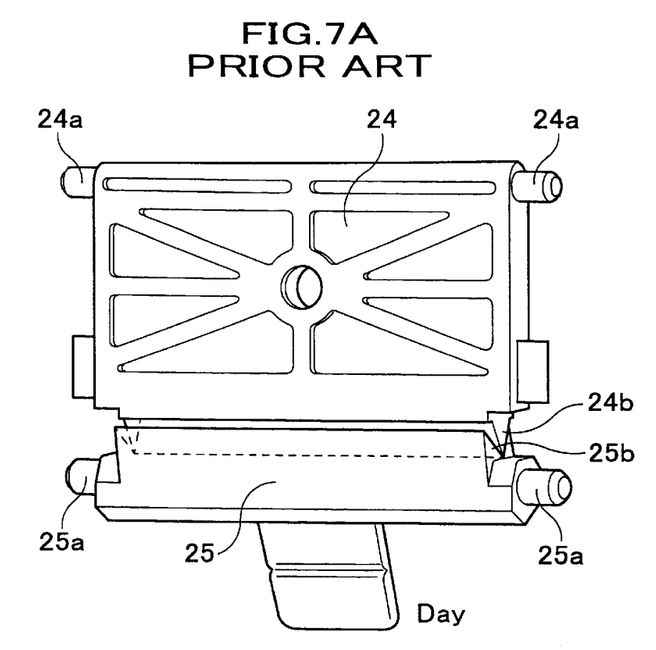
FIG. 7A is a perspective view illustrating engagement portions of a bracket and a lever that are located in the center of FIG. 6.

FIG. 7A is a perspective view for explaining an engagement between the bracket 24 and the lever 25 that are depicted in the center of FIG. 6. As shown in FIG. 7A, on right and left sides of an upper portion of the bracket 24 are formed pins 24a, 24a; the bracket 24 is fitted in a concave portion provided in the mirror housing 23, so as to get tilted by pivoting about the pins 24a, 24a.

On the other hand, while the lever 25 is shaped like a letter T, on right and left ends of the lever 25 are formed pins 25a, 25a as well, and the lever 25 is fitted in a concave portion provided in the mirror housing 23, so as to pivot about the pins 25a, 25a.

Figure 7B:
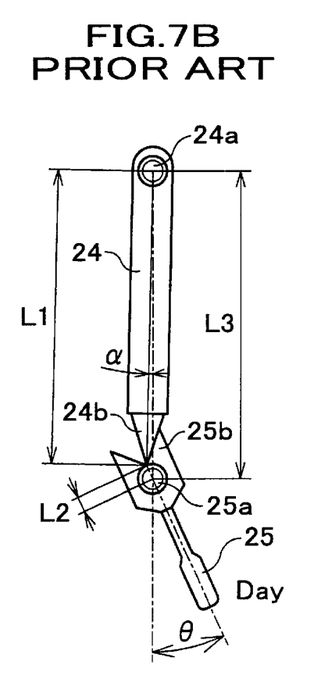
FIG. 7B is a right side view of the bracket and the lever as shown in FIG. 7A with the lever pivoted backward.
Figure 7C:
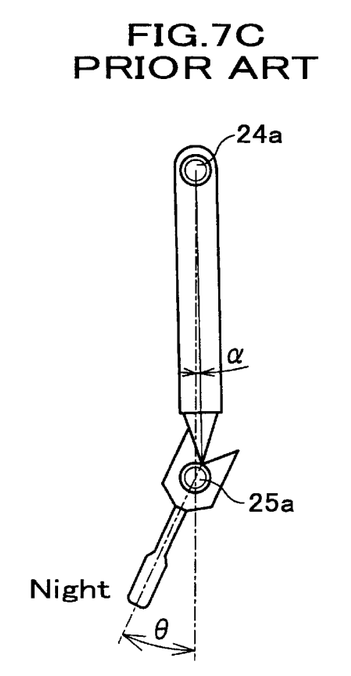
FIG. 7C is a right side view of the bracket and the lever as shown in FIG. 7A with the lever pivoted frontward.

As shown in FIGS. 7A through 7C, an engagement portion 24b of the bracket 24 is formed into an angular ridge, and an engagement portion 25b of the lever 25 is formed into a V-shaped groove. To be more specific, an edge of the engagement portion 24b that forms a ridgeline is brought into contact with a bottom of the V-shaped groove of the engagement portion 25b of the lever 25, and the lever 25 is operated to pivot till one of the sides that form the ridge of the bracket 24 is brought into contact with one of the sides that form the groove of the lever 25.

FIGS. 7B and 7C are right side views of FIG. 7A. FIG. 7B illustrates a "Day" condition where the lever 25 is pivoted to a back side; FIG. 7C illustrates a "Night" condition where the lever 25 is pivoted to a front side. As shown in FIG. 7B, when the lever 25 is pushed down to the back side, one side of the ridge of the bracket 24 is brought into contact with one side of the V-shaped groove of the lever 25, and this position is maintained. To be more specific, $L_1+L_2>L_3$ is satisfied where $L_1$ is a length from a center of the pin 24a to a distal end of the engagement portion 24b of the bracket 24; $L_2$ is a length from a center of the pin 25a to the bottom of the V-shaped groove of the lever 25; and $L_3$ is a distance from the center of the pin 24a of the bracket 24 to the center of the pin 25a of the lever 25, and thus the above position is maintained.

At this stage, the lever 25 tilts backward at an angle θ while the bracket 24 tilts frontward at an angle α. In contrast, when the lever 25 is operated to pivot frontward, the lever 25 tilts frontward at an angle θ, while the bracket 24 tilts backward at an angle θ, as shown in FIG. 7C. Thus, pivoting operation of the lever 25 (at an angle 2θ) may bring a quick shift in a tilt angle of the mirror 22 at an angle 2α.

As shown in FIG. 7B, for example, where $L_1$ is 40.0 mm, $L_2$ is 2.0 mm, and θ is 25 degrees, α becomes 1.21 degree, $L_3$ becomes 41.80 mm, and a difference between $L_1+L_2$ and $L_3$ becomes 0.2 mm; it thus turns out that $L_3$ is shorter.

However, the conventional interior rearview mirror 20 has an intrinsic disadvantage that the lever 25 is allowed to voluntarily pivot notwithstanding the lever 25 is not operated, when the mirror housing 23 is held and an adjustment is made in a field of view of the mirror 20. This is presumably because the difference between $L_1+L_2$ and $L_3$ is small, i.e., the small pivoting angle 2θ of the lever 25 is responsible therefor, and thus a small moment applied to the bracket 24 via the ball joint 26 of the stay 21 causes the lever 25 to switch its position when the mirror housing 23 is moved manually. It is therefore conceivable that providing the lever 25 with a larger pivoting angle 2θ by making an angle of the V-shaped groove of the lever 25 larger could serve to eliminate the above disadvantage. Disadvantageously, however, the larger the angle of the V-shaped groove, the more likely it could become that the ridge of the bracket 24 is easily disengaged from the V-shaped groove of the lever 25.

Figure 5A:
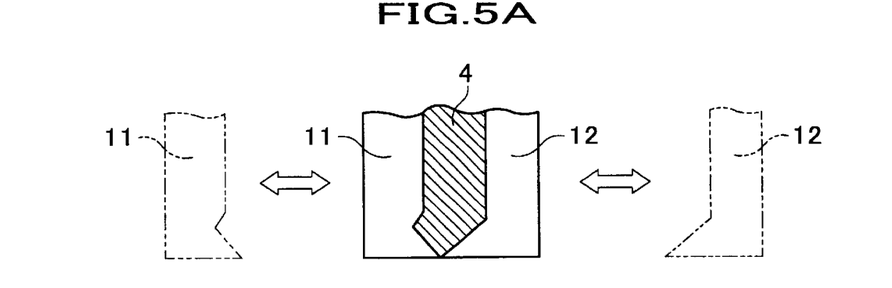
FIG. 5A is a schematic diagram showing a combination of mold parts that are used to form a bracket according to the present invention.
Figure 5B:
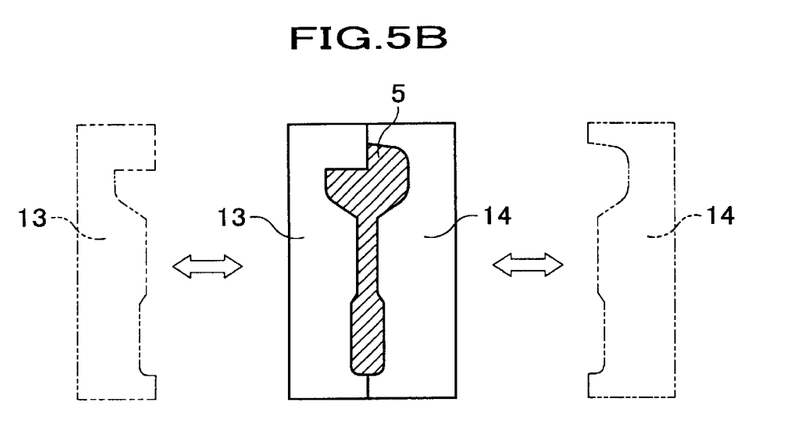
FIG. 5B is a schematic diagram showing a combination of mold parts that are used to form a lever according to the present invention.
Figure 5C:
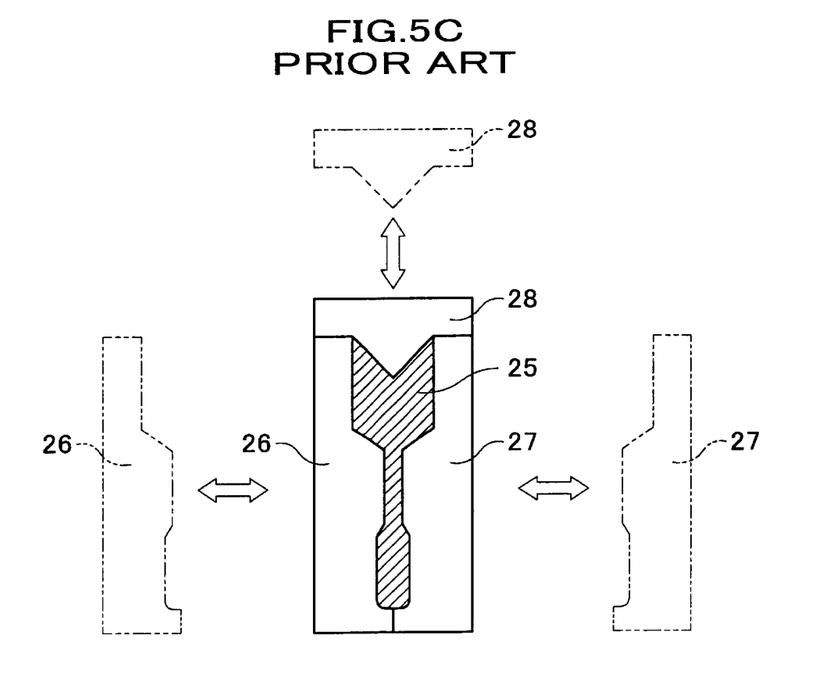
FIG. 5C is a schematic diagram showing a conventional combination of mold parts that are used to form a V-grooved lever.

Moreover, as shown in FIG. 5C that illustrates a conventional combination of mold parts for use with an injection molding machine for making a V-grooved lever 25, a conventional shape of the V-grooved lever 25 requires a slide 28 to form an under side of the lever 25 other than mold parts 26, 27 located at right and left sides of the lever 25, which thus causes an increase in number of mold parts, in structural complexity, and thus in manufacturing cost.

Under these circumstances, the present invention has been created to eliminate the above-discussed disadvantages in prior art.

SUMMARY OF THE INVENTION

Therefore, it is an exemplified object of the present invention to provide an interior rearview mirror that includes a lever having a larger pivoting angle so as not to voluntarily pivot when a mirror housing is held and an adjustment is made in a field of view of the mirror, and a bracket having a ridge provided so as not to get disengaged from a V-shaped groove of the lever. Moreover, it is another exemplified object of the present invention to provide an interior rearview mirror that may dispense with a slide or a mold part that forms an under section of the final casting for manufacturing the lever, thereby reducing manufacturing costs.

In order to achieve the above objects, there is provided an interior rearview mirror according to one aspect of the present invention as set forth in claim 1. The interior rearview mirror comprises a stay that is fixed in a vehicle, a bracket that is coupled to the stay with a ball joint formed at a distal end of the stay, a mirror housing that is tiltably pivoted on the bracket, a prismatic mirror that is held in the mirror housing, and a lever that is engaged with the bracket, pivoted in the mirror housing, and operated to pivot so that the bracket may tilt. At a lower end of the bracket are formed a first engageable projection having a projection at a front side and a second engageable projection having a projection at a back side which first and second engageable projections are alternately provided from side to side along the bracket. At an upper end of the lever are formed a straight engaging ridgeline parallel to a pivot axis of the lever, a first engageable depression that is formed from the engaging ridgeline toward a front side of the engaging ridgeline to engage with the first engageable projection, and a second engageable depression that is formed from the engaging ridgeline toward a back side of the engaging ridgeline to engage with the second engageable projection which first and second engageable depressions are alternately provided from side to side along the lever.

In this aspect of the present invention as set forth in claim 1, an engagement portion at which the bracket having a projection and the lever having a depression engage with each other includes a first engagement portion and a second engagement portion. The second engageable projection and the second engageable depression securely engage with each other when the lever is pivoted backward, while the first engageable projection and the first engageable depression securely engage with each other when the lever is pivoted frontward; therefore, a pivoting angle of the lever may be made greater. Moreover, the closer to the pivoting angle, the more securely the depression and projection of the engagement portion engage with each other, and thereby become more difficult to disengage from each other. In addition, an alternate arrangement of the depressions and projections contributes to enhanced stiffness of the engagement portion. Consequently, such an interior rearview mirror as may include a lever allowing a larger pivoting angle and a bracket whose engagement portion never disengages from an engagement portion of the lever may be brought into practical use.

The engaging ridgeline formed at an upper end of the lever is a straight line parallel to the pivot axis of the lever. More specifically, edges of the depressions that are arranged alternately from side to side along the lever are aligned so that each segment is combined to form one straight line.

Accordingly, the depressions (V-shaped grooves) that are provided alternately from side to side along the lever are formed from the engaging ridgeline toward a front or back side of the engaging ridgeline, and thus a slide for forming an under section of the mold as required in a conventional mold having parting lines for manufacturing a V-grooved lever is no more required, with the result that the manufacturing cost of the mold may be reduced.

It is understood that the engaging ridgeline is a ridge line of the lever that forms an axis of engagement between the bracket and the lever, and indicates a vertex from which depressions are formed toward right and left sides when the lever is viewed from a side thereof.

Other objects and further features of the present invention will become readily apparent from the following description of preferred embodiments with reference to accompanying drawings.

DETAILED DESCRIPTION OF THE PREFERRED EMBODIMENTS

A description will be given of one exemplified embodiment of the present invention with reference to the drawings.

Figure 1:
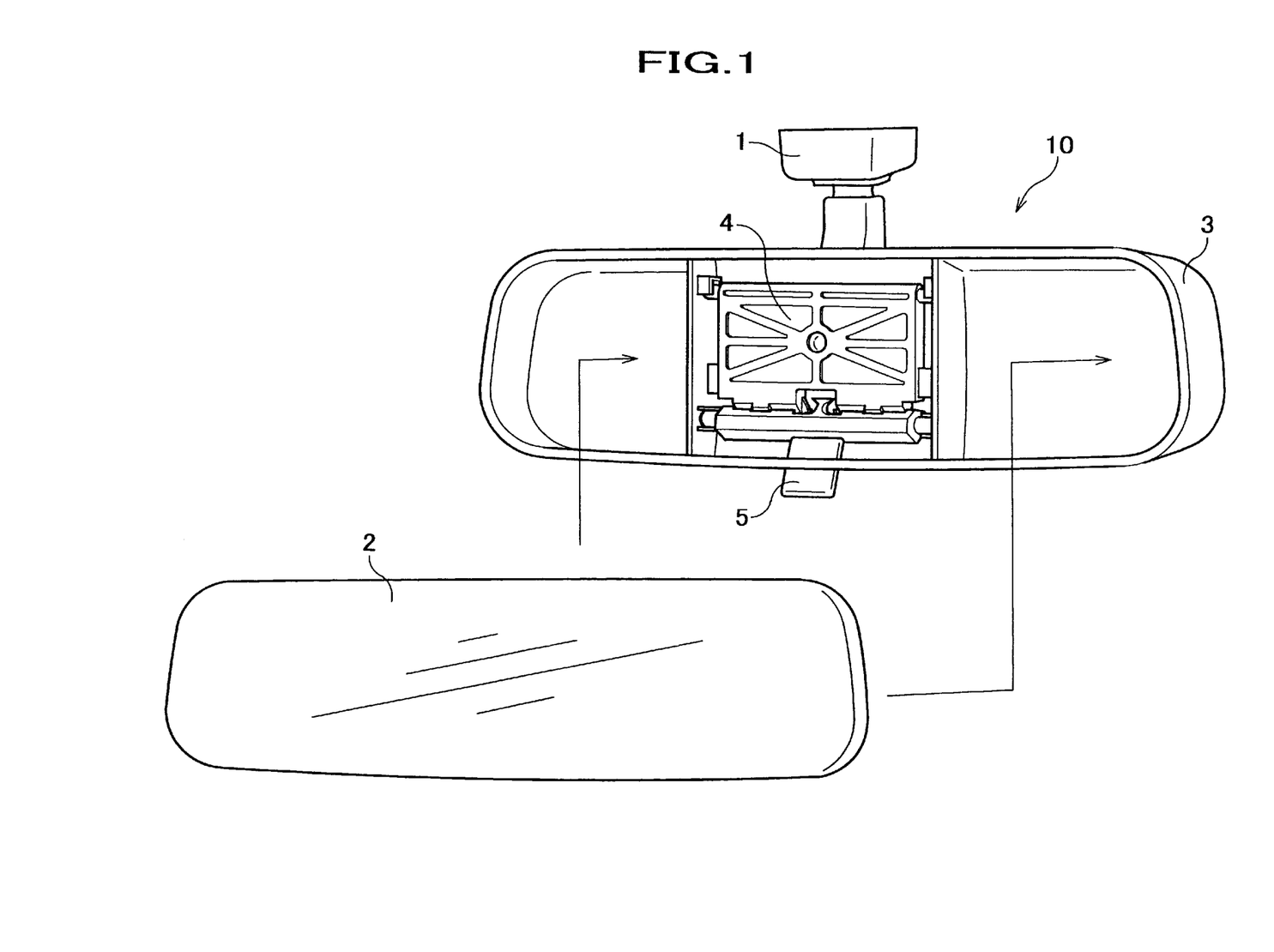
FIG. 1 is a perspective view of an interior rearview mirror according to the present invention.

FIG. 1 is a perspective view of an interior rearview mirror according to the present invention. FIG. 1 is a partially exploded illustration of the interior rearview mirror with a mirror element detached from a mirror housing. As shown in FIG. 1, the interior rearview mirror 10 according to the present invention is mounted on a ceiling near a driver's seat or on an inside of a windshield in a vehicle via a stay 1. The mirror 2 as a prismatic mirror is held in a groove (not shown) provided in a mirror housing 3. A ball joint (not shown) provided at a distal end of the stay 1 is fitted into a socket formed in a midsection of a basket 4 so that the bracket 4 is rotatably joined to the stay 1.

Accordingly, when the mirror housing 3 is handled to adjust a field of view of the mirror 2, an adjustment in positioning is made by turning the bracket 4 about the ball joint provided at the distal end of the stay 1. On the other hand, an antiglare operation to be performed in order to immediately change a reflection angle of the mirror 2 is to operate (pivot) the lever 5 engaged with the bracket 4 so as to tilt the mirror housing 3. Thereby, an orientation of the mirror 2 is switched, and the reflection angle of light incident on the mirror 2 is changed, and thus an antiglare function may be achieved.

Figure 2A:
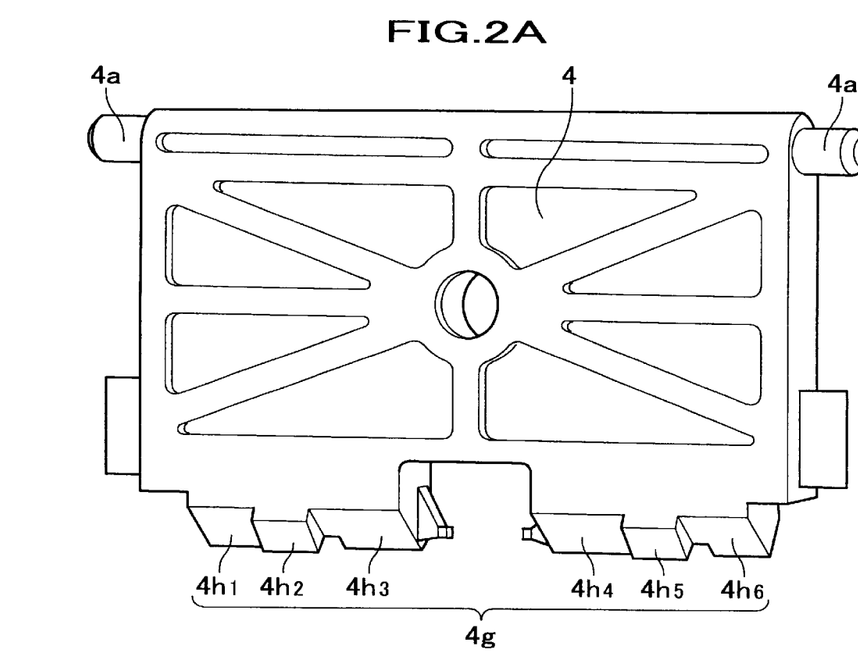
FIG. 2A is a front perspective view of a bracket shown in FIG. 1.
Figure 2B:
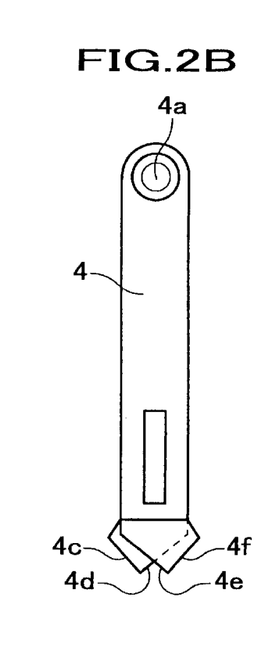
FIG. 2B is a right side view of the bracket shown in FIG. 1.
Figure 2C:
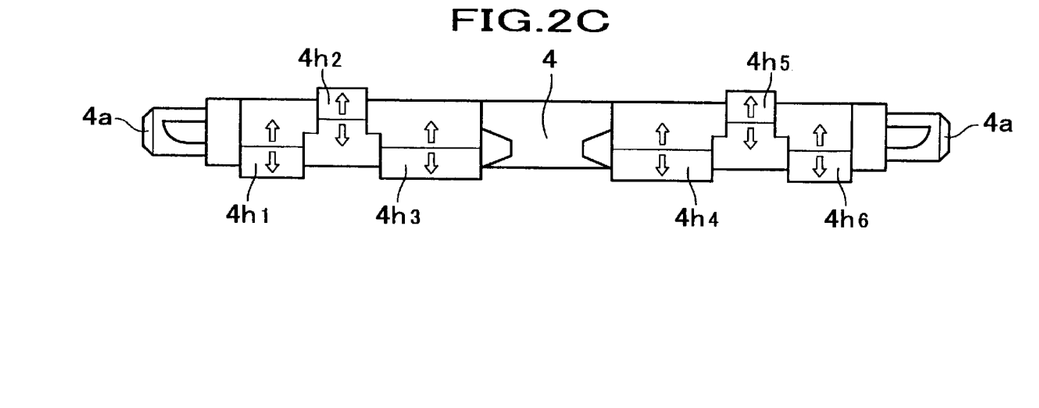
FIG. 2C is a bottom plan view of the bracket shown in FIG. 1.

FIGS. 2A through 2C illustrate a bracket as shown FIG. 1. FIG. 2A is a magnified perspective view, FIG. 2B is a right side view of FIG. 2A, and FIG. 2C is a bottom plan view of FIG. 2A.

As shown in FIG. 2A, on right and left sides of an upper portion of the bracket 4 are formed pins 4a, 4a, which are fitted in a concave portion provided in the mirror housing 3, so that the bracket 4 may get tilted by pivoting about the pins 4a, 4a.

At a lower end of the bracket 4 are formed projections $4h_2$, $4h_5$ of a first engageable projection at a front side, and projections $4h_1$, $4h_3$, $4h_4$, $4h_6$ of a second engageable projection at a back side; the projections of first and second engageable projections are alternately arranged side by side.

As shown in FIG. 2B, the first engageable projection is formed in an angular ridge with sides 4c, 4d and projects to the left while the second engageable projection is formed in an angular ridge with sides 4e, 4f and projects to the right, so that the first and second engageable projections are engageable with the lever 5. It is thus understood that two rows of projections toward the front and the back are formed in the present embodiment though a conventional lever has a projection formed in one row. As shown in FIG. 2A, an engagement portion 4g of the bracket 4 is formed with ridge-shaped projections arranged alternately side by side along the bracket 4; i.e., the projections $4h_1$ through $4h_6$ constitute the engagement portion 4g.

Figure 3A:
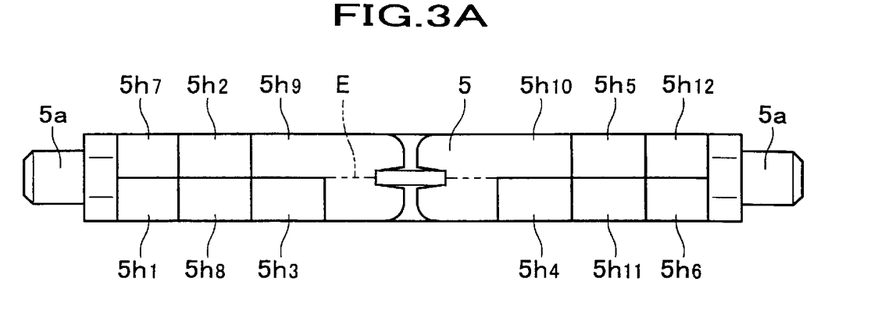
FIG. 3A is a top plan view of a lever shown in FIG. 1.
Figure 3B:
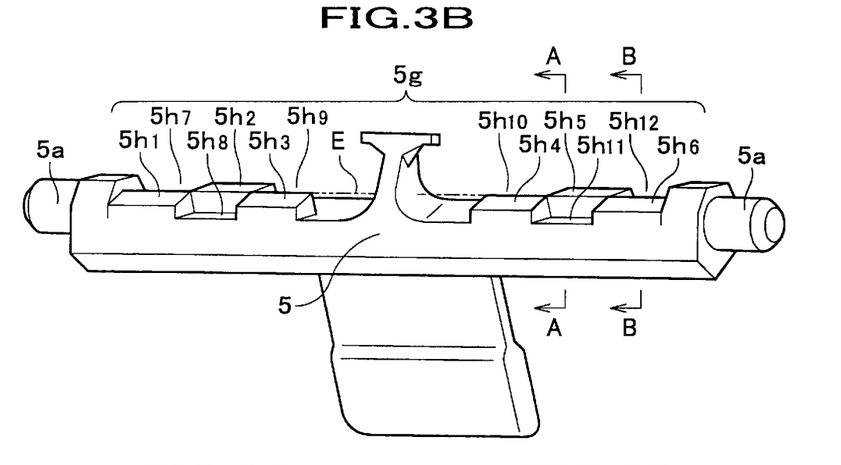
FIG. 3B is a front perspective view of the lever shown in FIG. 1.
Figure 3C:
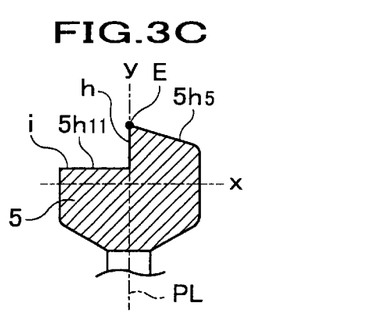
FIG. 3C is a cross-sectional view of the lever shown in FIG. 1 taken along line A—A in FIG. 3B.
Figure 3D:
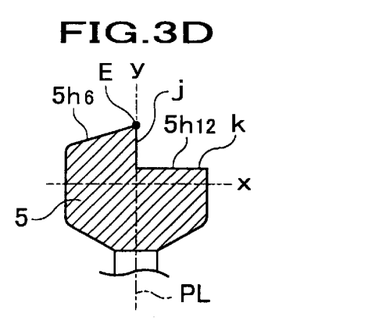
FIG. 3D is a cross-sectional view of the lever shown in FIG. 1 taken along line B—B in FIG. 3B.

FIGS. 3A through 3G illustrate a lever 5 as shown in FIG. 1. FIG. 3A is a top plan view, FIG. 3B is a front perspective view, FIG. 3C is a cross-sectional view taken along line A—A in FIG. 3B, FIG. 3D is a cross-sectional view taken along line B—B in FIG. 3B, and FIGS. 3E, 3F, 3G are a cross-sectional view taken along line A—A showing a variation of the depression (V-shaped groove). As shown in FIG. 3B, the lever 5 is shaped like a letter T, and on right and left ends of the lever 5 are formed pins 5a, 5a, so that the pins 5a, 5a are fitted in a concave portion provided in the mirror housing 3, allowing the lever 5 to pivot about the pins 5a, 5a.

At an upper end of the lever 5 are formed a first engageable depression having depressions $5h_8$, $5h_{11}$ that are formed toward a front side to engage respectively with the projections $4h_2$, $4h_5$ of the first engageable projection of the bracket 4, and a second engageable depression having depressions $5h_7$, $5h_9$, $5h_{10}$, $5h_{12}$ that are formed toward a back side to engage respectively with the projections $4h_1$, $4h_3$, $4h_4$, $4h_6$ of the second engageable projection of the bracket 4, which first and second engageable depressions are alternately provided from side to side along the lever 5.

As shown in FIG. 3A, a dash-double dot line E indicates an engaging ridgeline at which the lever 5 is engaged with the bracket 4 when the lever 5 pivots about the pins 5a, 5a as a pivot axis; each engaging ridgeline of the engageable portions forms a segment which aligns with each other and extends from side to side along the lever 5. In each cross-sectional view shown in FIGS. 3C and 3D, vertices formed in the first engageable depression and the second engageable depression denote the engaging ridgeline E.

FIG. 3C shows a depression (V-shaped groove) of the first engageable depression. One side h forming the V-shaped groove passes through the engaging ridgeline E, and coincides with the axis y, so that the depression is formed from the engaging ridgeline E toward a front side, while the other side 1 forming the V-shaped groove is formed in parallel with the axis x.

FIG. 3D shows a depression (V-shaped groove) of the second engageable depression. One side j forming the V-shaped groove passes through the engaging ridgeline E, and coincides with the axis y, so that the depression is formed from the engaging ridgeline E toward a back side, while the other side k forming the V-shaped groove is formed in parallel with the axis x.

Figure 3E:
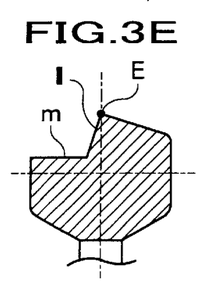
FIG. 3E is a cross-sectional view of a variation of the lever as shown in FIG. 3C.
Figure 3F:
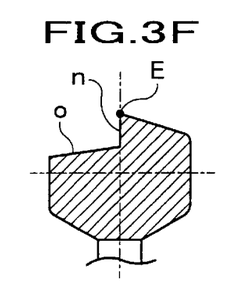
FIG. 3F is a cross-sectional view of another variation of the lever as shown in FIG. 3C.
Figure 3G:
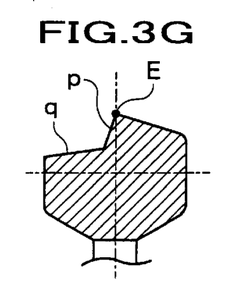
FIG. 3G is a cross-sectional view of yet another variation of the lever as shown in FIG. 3C.

Further illustrated in FIGS. 3E, 3F, and 3G are variations of the lever 5 as shown in FIG. 3C. In FIG. 3E, one side 1 forming the depression (V-shaped groove) passes through the engaging ridgeline E, and leans so as to intersect with the axis y, so that the depression is formed from the engaging ridgeline E toward a front side, while the other side m forming the V-shaped groove is formed in parallel with the axis x.

In FIG. 3F, one side n forming the depression (V-shaped groove) passes through the engaging ridgeline E, and coincides with the axis y, so that the depression is formed from the engaging ridgeline E toward a front side, while the other side o slopes so as to intersect with the axis x.

In FIG. 3G, one side p forming the depression (V-shaped groove) passes through the engaging ridgeline E, and leans so as to intersect with the axis y, so that the depression is formed form the engaging ridgeline E toward a front side, while the other side q forming the V-shaped groove slopes so as to intersect with the axis x.

Accordingly, the depression (V-shaped groove) may be configured to form an angle of 90 degrees or greater.

It is to be understood that the projections and depressions arranged on the bracket 4 and the lever 5 may be reversed, and may be increased or decreased in number.

As described above, each side h, j, l, n, p of the V-shaped groove passes through an engaging ridgeline that is formed when the lever 5 pivots about the pins 5a, 5a and engages with the bracket 4, and thus a parting line (PL) of the mold for the lever 5 is aligned with the engaging ridgeline, so that an under section of the mold may be saved.

Figure 4A:
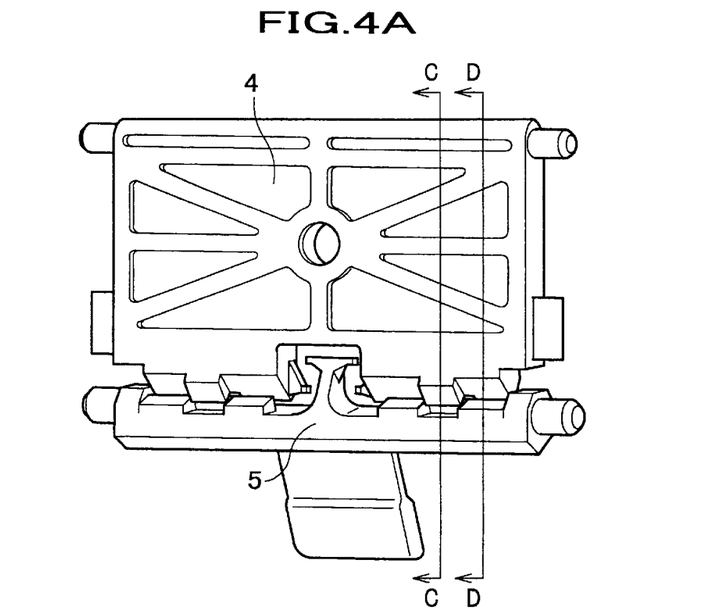
FIG. 4A is a perspective view of the bracket and the lever that engage with each other according to the present invention.
Figure 4B:
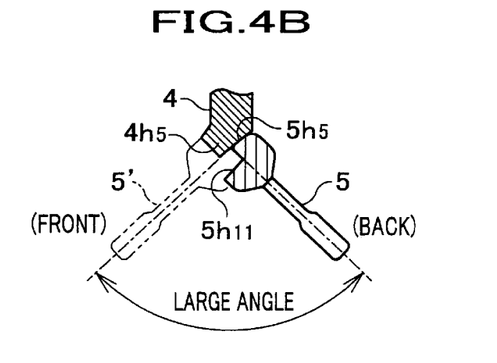
FIG. 4B is a cross-sectional view of the bracket and the lever, taken along line C—C in FIG. 4A.
Figure 4C:
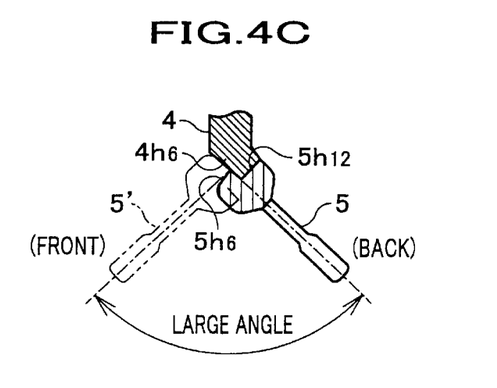
FIG. 4C is a cross-sectional view of the bracket and the lever, taken along line D—D in FIG. 4A.
Figure 4D:
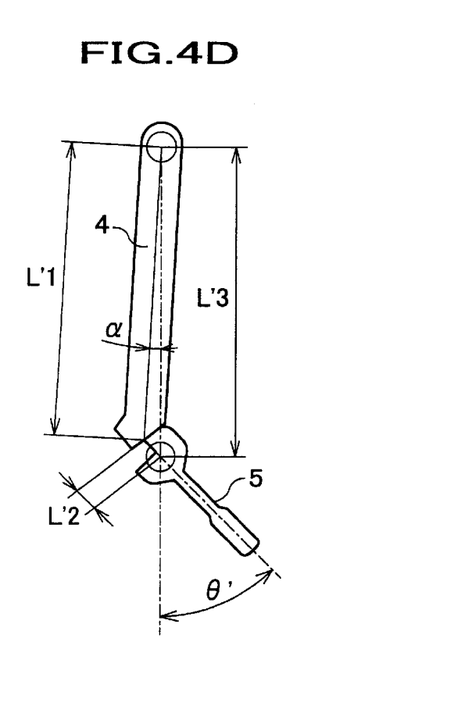
FIG. 4D is a right side view of the bracket and the lever as shown in FIG. 4A, for explaining a pivoting angle of the lever and increase in force necessary to operate the lever.

FIGS. 4A through 4D illustrate a bracket and lever that engage with each other. FIG. 4A is a perspective view of the bracket and lever that engage with each other, FIG. 4B is a cross-sectional view of the bracket and lever taken along line C—C in FIG. 4A, FIG. 4C is a cross-sectional view of the bracket and lever taken along line D—D in FIG. 4A, and FIG. 4D is a right side view of the bracket and lever as shown in FIG. 4A for explaining a pivoting angle of the lever 5 according to the present invention and increase in force necessary to operate the lever 5.

When the lever 5 is pushed down to the back side, as shown in FIGS. 4B and 4C, the depression $5h_{11}$ of the first engageable depression of the lever 5 and the projection $4h_5$ of the first engageable projection of the bracket 4 do not engage with each other, but the depression $5h_{12}$ of the second engageable depression of the lever 5 and the projection $4h_6$ of the second engageable projection of the bracket 4 engage with each other, and thus the lever 5 and the bracket 4 are kept in engagement with each other (as indicated in a solid line).

On the other hand, when the lever 5' is pulled down to the front side, the depression $5h_{12}$ of the second engageable depression of the lever 5' and the projection $4h_6$ of the second engageable projection of the bracket 4 do not engage with each other (see FIG. 4C), but the depression $5h_{11}$ of the first engageable depression of the lever 5' and the projection $4h_5$ of the first engageable projection of the bracket 4 engage with each other, and thus the lever 5' and the bracket 4 are kept in engagement with each other as well (as indicated in a dash-double dot line).

Likewise, engagement portions of the lever 5 and the bracket 4 are comprised of projections and depressions that are alternately provided, and thus may completely engage with each other. Moreover, this arrangement may facilitate production and assembly of the interior rear view mirror.

FIG. 4D is a right side view of the bracket and lever as shown in FIG. 4A. A description will be given of the present embodiment in comparison with the above-described conventional bracket and lever as shown in FIG. 7B. For example, where $L_3$ (41.80 mm) and α (1.21 degree) are the same, if θ' is 45 degrees (2θ'=45 degrees), then $L'_1$ is 41.02 mm and $L'_2$ is 1.22 mm. Consequently, $(L'_1+L'_2)-L_3$ becomes 0.43 mm, and the difference $((L_1+L_2)-L_3)$ is approximately twice as large as 0.2 mm as in FIG. 7B. This requires the pins to spread out twice wider when the lever is pivoted in the same degree, and thus increases the strength necessary to operate the lever approximately twice as much.

FIG. 5A is a schematic diagram showing a combination of mold parts that are used to form the bracket 4.

The bracket 4 may be injection-molded using a mold separable into two mold parts 11, 12 as shown in FIG. 5A. The lever 5 may be manufactured as well using a mold separable into two mold parts 13, 14 as shown in FIG. 5B. The condition remains the same with the lever 5 viewed from any different section, and thus the two-part mold, which is a combination of the mold parts 13, 14, may be used to manufacture the lever 5.

As described above, an under section of the mold as required in the conventional V-grooved lever as shown in FIG. 5C may be saved, and thus construction of the mold is simplified, so that manufacturing costs may be reduced.

Although the preferred embodiments of the present invention have been described above, various modifications and changes may be made in the present invention without departing from the spirit and scope thereof.

According to the invention as set forth in claim 1, a first engageable projection and a second engageable projection are provided in a bracket, while a first engageable depression and a second engageable depression are provided in a lever; thus a pivoting angle of the lever may be made greater with the bracket and the lever prevented from being disengaged from each other as either set of the first or second engageable projections are engaged with corresponding set of the first or second engageable depressions. Moreover, the greater pivoting angle of the lever may advantageously make the difference between $L_3$ and $L_1+L_2$ greater, which makes the strength necessary to pivot the lever greater, thus making it possible to prevent the lever to voluntarily pivot when an adjustment is made in a field of view of the mirror.

Further, each engageable portion has depressions and projections alternately arranged to securely engage with each other; therefore, an unintentional disengagement may be prevented, and engagement portions may be supported from front, back, right and left directions, so that the rigidity of the engagement portions may be enhanced.

Furthermore, the depressions (V-shaped grooves) provided alternately from side to side along the lever are formed from an engaging ridgeline toward a front side or back side; therefore, an under section as in a mold for manufacturing a conventional V-grooved lever may be eliminated, and thus a slide may be saved and manufacturing costs of the mold may be reduced.

What is claimed is:

1. An interior rearview mirror comprising:

a stay that is fixed in a vehicle;

a bracket that is coupled to the stay with a ball joint formed at a distal end of the stay;

a mirror housing that is tiltably pivoted on the bracket;

a prismatic mirror that is held in the mirror housing; and a lever that is engaged with the bracket, pivoted in the mirror housing, and operated to pivot so that the bracket may tilt, wherein a first engageable projection having a projection at a front side and a second engageable projection having a projection at a back side are formed at a lower end of the bracket which the first and second engageable projections are alternately provided from side to side along the bracket; and wherein a straight engaging ridgeline parallel to a pivot axis of the lever, a first engageable depression that is formed from the engaging ridgeline toward a front side of the engaging ridgeline to engage with the first engageable projection, and a second engageable depression that is formed from the engaging ridgeline toward a back side of the engaging ridgeline to engage with the second engageable projection are formed at an upper end of the lever which the first and second engageable depressions are alternately provided from side to side along the lever.

* * * * *